United States Patent [19]
Johnson et al.

[11] Patent Number: 4,808,674

[45] Date of Patent: Feb. 28, 1989

[54] ARYL ESTER-GRAFTED POLYPHENYLENE ETHERS AND PHENYLENE ETHER-AMIDE GRAFT COPOLYMERS PREPARED THEREFROM

[75] Inventors: Bruce C. Johnson, Saratoga Springs; Thomas W. Hovatter, Schenectady; Steven T. Rice, Schenectady; Herbert S. Chao, Schenectady, all of N.Y.

[73] Assignee: General Electric Company, Schenectady, N.Y.

[21] Appl. No.: 88,634

[22] Filed: Aug. 24, 1987

[51] Int. Cl.$^4$ .................... C08F 283/08; C08F 71/04
[52] U.S. Cl. .................................. 525/397; 525/392; 525/905
[58] Field of Search ................................ 525/392, 397

[56] References Cited

U.S. PATENT DOCUMENTS

| 3,522,326 | 6/1970 | Bostick et al. | 525/392 |
| 4,678,839 | 7/1987 | Hallgren et al. | |

FOREIGN PATENT DOCUMENTS

| 0121974 | 3/1984 | European Pat. Off. | |
| 66452 | 4/1984 | Japan | 525/392 |

*Primary Examiner*—Jacob Ziegler
*Attorney, Agent, or Firm*—William H. Pittman; James C. Davis, Jr.; James Magee, Jr.

[57] ABSTRACT

Aryl ester-grafter polyphenylene ethers are prepared by heating a polyphenylene ether with an olefinic aryl ester, usually an unsubstituted or substituted phenyl acrylate. The products react with lactams such as ε-caprolactam in the presence of lactam polymerization catalysts to produce phenylene ether-amide copolymers.

18 Claims, No Drawings

ARYL ESTER-GRAFTED POLYPHENYLENE ETHERS AND PHENYLENE ETHER-AMIDE GRAFT COPOLYMERS PREPARED THEREFROM

This invention relates to grafted polyphenylene ether compositions, methods for their preparation and uses thereof.

Polyphenylene ethers (also known as polyphenylene oxides) are a known class of resinous materials useful in engineering resins for high performance applications. For the most part, they are blended with other resins such as polystyrenes or polyamides and molded to produce articles having advantageous properties such as high impact strength and thermal stability.

Because of the excellent properties imparted by polyphenylene ethers to the blends in which they are incorporated, they are under consideration for still wider varieties of use such as in automotive body parts. Such uses require even stricter standards of structural integrity and chemical resistance.

In U.S. Pat. No. 4,678,839, there are described various products prepared by polymerizing lactams in the presence of polyphenylene ethers. These include phenylene ether-amide copolymers prepared by using a functionalized polyphenylene ether which serves as a lactam polymerization promoter and incorporates itself in the polymer molecule thus formed. In various respects, however, the invention disclosed therein leaves room for improvement.

In the first place, many of the procedures described are principally useful under solution polymerization conditions. They are not easily adapted to melt polymerization, which is of particular value in systems employing polyphenylene ethers.

In the second place, the phenylene ether-amide copolymers frequently contain linkages such as ester or urethane groups. Such linkages are not highly stable under the strongly basic conditions commonly employed for lactam polymerization.

The present invention provides a new class of functionalized polyphenylene ethers which react readily with lactams under basic polymerization conditions to form phenylene ether-amide copolymers. These copolymers may be prepared in the melt or in solution, and the linkages therein are highly stable under the conditions prevailing during polymerization. Also provided is a new class of phenylene ether-amide copolymers with utility in numerous applications.

In one of its aspects, the present invention is a method for preparing an aryl ester-grafted polyphenylene ether which comprises effecting reaction, at a temperature in the range of about 225°–350° C., between a polyphenylene ether and an olefinic aryl ester of the formula $$ZCH=CH-\overset{O}{\underset{\|}{C}}-OA, \qquad (I)$$

wherein Z is hydrogen or

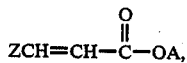

and A is an aromatic radical. Another aspect of the invention is the aryl ester-grafted polyphenylene ethers prepared by said method.

The polyphenylene ethers used in the present invention are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

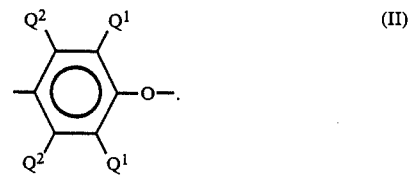

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35-0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

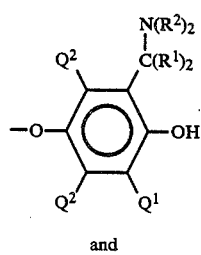

(III)

and

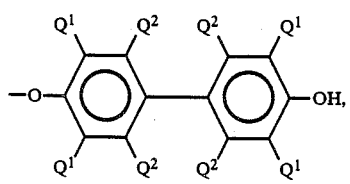

(IV)

wherein $Q^1$ and $Q^2$ are as previously defined; each $R^1$ is independently hydrogen or alkyl, with the proviso that the total number of carbon atoms in both $R^1$ radicals is 6 or less; and each $R^2$ is independently hydrogen or a $C_{1-6}$ primary alkyl radical. Preferably, each $R^1$ is hydrogen and each $R^2$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

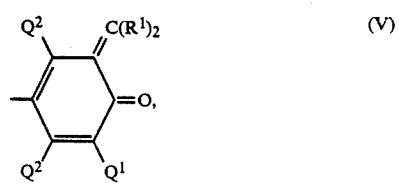

(V)

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

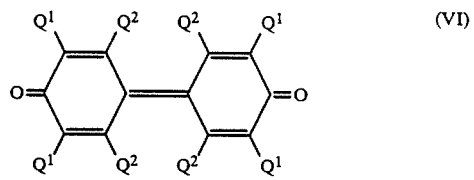

(VI)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The olefinic aryl esters grafted on the polyphenylene ethers according to the present invention are the monocarboxylic and dicarboxylic acid esters (e.g., acrylates, maleates and fumarates) of formula I, according as Z is hydrogen or an unsubstituted or substituted carbaryloxy group. The A radical may be, for example, phenyl, α-naphthyl or β-naphthyl and may contain up to about 3, but most often no more than one, substituent illustrated by methyl, t-butyl, methoxy, nitro and halo, usually in the para-position on a phenyl group.

The acrylates, in which Z is hydrogen, are preferred by reason of their high grafting efficiency. Higher boiling esters are particularly efficient, apparently because of their relatively low volatility and hence low susceptibility to vaporization under polyphenylene ether melt conditions. Therefore, the substituted phenyl acrylates are often especially preferred.

The reaction between the polyphenylene ether and the olefinic aryl ester is conducted at temperatures in the range of about 225°–350° C. The proportions of reagents are subject to wide variation, depending on the degree of functionalization desired; the molar ratio of olefinic aryl ester to polyphenylene ether is typically in the range of about 0.25–10.0:1.

Free radical initiators are unnecessary in the preparation of the aryl ester-grafted polyphenylene ether, and the use of such initiators is not contemplated as part of this invention. The fact that reaction does take place under these conditions is quite unexpected in view of the disclosure of Japanese Kokai No. 84/66452, which explicitly states by way of comparative test results that similar products prepared in the absence of such initiators are of little or no utility.

The reaction may be conducted in solution or in the melt, with melt reactions frequently being preferred by reason of their particular convenience. Such melt reactions are often carried out in an extruder or similar equipment. Solution reactions are typically conducted in such diluents as toluene, xylene, chlorobenzene, o-dichlorobenzene, 1,2,4-trichlorobenzene or diphenyl ether, followed by isolation of the phenyl ester-functionalized polyphenylene ether by conventional operations such as precipitation by a non-solvent therefor. Purification may be achieved when necessary by precipitation and decomposition of a methylene chloride complex of the polyphenylene ether as described by Factor et al. in *J. Polymer Sci., Polymer Letters Ed.*, 7, 205–209 (1969).

The precise chemical nature of the functionalization which takes place upon practice of the above-described method is not known with certainty. The principal reaction is probably a thermally initiated free radical interaction of the carbon-carbon double bond in the olefinic aryl ester with the aromatic rings of the polyphenylene ether or the substituents thereon, especially the latter, to produce a product which may include single moieties and/or grafted side chains derived from the olefinic aryl ester.

The preparation of the aryl ester-grafted polyphenylene ethers of this invention is illustrated by the following examples. In each example, a polyphenylene ether prepared by oxidative coupling of 2,6-xylenol in the presence of a copper bromide-amine catalyst including di-n-butylamine, and having a number average molecular weight of about 20,000, was used.

EXAMPLE 1

Mixtures of polyphenylene ether with various molar proportions of olefinic phenyl esters were prepared in a blender and extruded in a twin-screw extruder at 320° C. The extruder was first purged with untreated polyphenylene ether and the first 250 grams of the phenyl ester-functionalized product was discarded to ensure freedom from unreacted material. The extrudates were pelletized, dried, dissolved in chloroform and re-precipitated with methanol. The precipitated material was dissolved in methylene chloride with warming, after which the methylene chloride-polyphenylene ether complex was precipitated by cooling, freed from methylene chloride by heating in vacuum and analyzed by Fourier transform infrared spectroscopy to determine the porportion of ester groups.

The results are given in Table I, in carbonyl groups per mole of polyphenylene ether for various mole ratios of olefinic phenyl ester to polyphenylene ether.

TABLE I

| Phenyl ester ratio: | 0.75 | 1.50 | 2.25 | 3.75 |
| --- | --- | --- | --- | --- |
| Phenyl acrylate | 0.3 | 0.4 | — | 0.7 |
| p-Methoxyphenyl acrylate | 0.4 | — | 0.9 | 1.3 |
| p-Fluorophenyl acrylate | 0.4 | — | 0.9 | 1.2 |
| p-α-Cumylphenyl acrylate | 0.4 | — | 1.1 | 1.6 |
| Phenyl fumarate | 0.3 | 0.5 | — | 1.1 |

EXAMPLE 2

Solutions of 15 grams of polyphenylene ether and various porportions of p-methoxyphenyl acrylate in 50 grams of diphenyl ether were heated under nitrogen for 5 hours at 250° C., with stirring. The solutions were diluted with chloroform and the phenyl ester-functionalized polyphenylene ethers were precipitated with methanol and purified as in Example 1. The products obtained using 3.75 and 7.5 moles of phenyl ester per mole of polyphenylene ether were respectively found to contain 0.6 and 1.8 carbonyl groups per molecule.

The aryl ester-grafted polyphenylene ethers of this invention may, as previously indicated, be reacted with lactams to form phenylene ether-amide copolymers. Accordingly, a further aspect of the invention is polymerizable compositions comprising a mixture of at least one lactam, said aryl ester-grafted polyphenylene ether and a lactam polymerization catalyst.

Various known lactams may be used. They include those having the formula

(VII)

in which $R^3$ is an alkylene radical which includes a straight chain containing about 2–12 and preferably about 4–12 carbon atoms. Illustrative lactams are pivalolactam, δ-valerolactam, ε-caprolactam and laurolactam, in which $R^3$ is $C(CH_3)_2CH_2$, $(CH_2)_4$, $(CH_2)_5$ and $(CH_2)_{11}$ respectively. ε-Caprolactam and laurolactam are especially preferred.

The third component of the polymerizable mixtures of this invention is a lactam polymerization catalyst. For this purpose, any known catalysts for lactam polymerization may be employed. These include water, protonic and Lewis acids such as phosphoric acid and zinc chloride, and basic reagents.

The basic reagents are preferred. They may be inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. Bases of this type react with lactams under certain conditions by displacing the hydrogen atom attached to nitrogen. It is also contemplated, therefore, to employ preformed lactam salts in the mixtures of this invention. The preferred basic reagents are the alkali metal (especially sodium) hydrides and the lactam salts of alkali and alkaline earth metals.

The relative proportions of aryl ester-grafted polyphenylene ether, lactam and basic reagent in the mixtures of this invention are largely dependent on the intended properties and end uses of the polymerized product. Such mixtures may generally contain about 10–97% grafted polyphenylene ether by weight, based on polyphenylene ether and lactam. The amount of basic reagent is ordinarily about 1–100 milliequivalents per mole of lactam.

Conventional blending techniques may be used to prepare the polymerizable mixtures of this invention. Examples of such techniques are dissolution of the grafted polyphenylene ether in the lactam, dry blending of the two followed by heating until homogeneous (e.g., in extrusion equipment), and dissolution in a solvent for both, optionally followed by removal of said solvent by evaporation. The lactam polymerization catalyst is usually added last, typically just before polymerization.

Polymerization of the polymerizable compositions of this invention produces resinous compositions which, together with the method for their preparation, are other aspects of the invention. Polymerization is generally effected under art-recognized lactam polymerization conditions. Thus, water- and acid-catalyzed polymerization is typically conducted at temperatures in the range of about 225°–275° C., frequently under autogenous or higher pressure. When the preferred basic catalysts are employed, anionic polymerization is typically effected at temperatures in the range of about 80°–200° C.

It is believed that the aryl ester-grafted polyphenylene ethers of this invention react with lactam anions under basic conditions to form polymeric N-acyllactams, with the generation of an unsubstituted or substituted aryloxide anion which is a good leaving group. The N-acyllactams are known to be effective as lactam polymerization promoters, incorporating themselves in the resulting polyamide as end groups.

The preparation of polymerizable compositions according to the invention and their conversion to polyphenylene ether-amide copolymers is illustrated by the following example.

EXAMPLE 3

A solution of 20 grams of the p-methoxyphenyl acrylate-grafted polyphenylene ether of Example 1 prepared using a 3.75:1 molar ratio of acrylate in 70 grams of ε-caprolactam was prepared. In a separate vessel was prepared, at 130° C., a solution of 1 gram of sodium hydride in 10 grams of ε-caprolactam. The hydride solution was added under nitrogen at 180° C., with stirring, to the solution of the phenyl ester-grafted polyphenylene ether. In 30 seconds the reaction became too viscous to stir. The mixture was cooled and the flask was broken to recover the product, which was shown by selective extraction with chloroform and formic acid to contain about 55% phenylene ether-amide copolymer.

The phenylene ether-amide copolymers of this invention are characterized by high thermal stability and other advantageous properties characteristic of polyphenylene ethers, as well as the high solvent resistance and other properties attributable to the crystalline nature of the polyamide constituent.

It is within the scope of the invention to combine the polymerizable mixtures of the invention, or the phenylene ether-amide copolymers prepared therefrom, with other materials. Examples of such materials are polystyrenes, including styrene homopolymers, random styrene copolymers, block copolymers of styrene with dienes or with other olefins or olefin mixtures, and rubber-modified polystyrenes such as high impact polystyrene. Said polystyrenes are miscible with polyphenylene ethers in all proportions, and the amounts thereof in the mixture may vary accordingly. Further examples are other polyamides such as nylon-6,6 and others known in the art, elastomers such as diene rubbers, ethylene-propylene rubbers, ethylene-propylene-diene rubbers (EPDM's), butyl rubbers and silicone elastomers, and the lactam polymerization promoters described hereinabove.

Easily flowable blend compositions comprising aryl ester-grafted polyphenylene ethers and minor amounts, typically about 3–20% by weight, of lactam may be prepared which are solid at room temperature and have low melt viscosities at molding temperatures. The polymerizable compositions of this invention may also be used in casting and reaction injection molding procedures. This is typically accomplished by formulating one component comprising, for example, lactam and basic catalyst, and another component comprising aryl ester-grafted polyphenylene ether and lactam, and blending the two just before charging to the mold or actually in the mold, under polymerization conditions.

Molded articles having extremely high impact strengths can be produced from blends of the resinous compositions of this invention with elastomeric materials such as the polystyrenes previously mentioned.

What is claimed is:

1. A method for preparing a resinous composition which comprises:
    preparing an aryl ester-grafted polyphenylene ether by effecting reaction, at a temperature in the range of about 225°–350° C., between a polyphenylene ether and an olefinic aryl ester of the formula

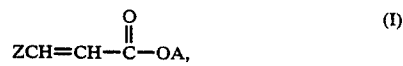

wherein Z is hydrogen or

and A is an aromatic radical; and
    heating a mixture comprising at least one lactam, a lactam polymerization catalyst and said aryl ester-grafted polyphenylene ether under polymerization conditions.

2. A method according to claim 1 wherein the polyphenylene ether comprises structural units having the formula

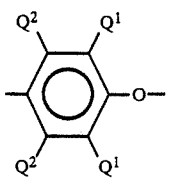

(II)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein the lactam has the formula

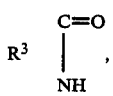

(VII)

wherein $R^3$ is an alkylene radical which includes a straight chain containing about 2–12 carbon atoms.

4. A composition according to claim 3 wherein $R^3$ includes a straight chain containing about 4–12 carbon atoms and the catalyst is an alkali metal hydride or a lactam salt of an alkali or alkaline earth metal.

5. A method according to claim 4 wherein Z is hydrogen and A is unsubstituted or substituted phenyl, α-naphthyl or β-naphthyl.

6. A method according to claim 5 wherein the molar ratio of olefinic aryl ester to polyphenylene ether is in the range of about 0.25–10.0:1.

7. A composition according to claim 6 wherein the lactam is ε-caprolactam.

8. A method according to claim 7 wherein the reaction is conducted in the melt.

9. A method according to claim 5 wherein A is phenyl.

10. A method according to claim 5 wherein A is p-methoxyphenyl.

11. A method according to claim 5 wherein A is p-fluorophenyl.

12. A method according to claim 5 wherein A is p-α-cumylphenyl.

13. A resinous composition prepared by the method of claim 1.

14. A resinous composition prepared by the method of claim 2.

15. A resinous composition prepared by the method of claim 3.

16. A resinous composition prepared by the method of claim 4.

17. A resinous composition prepared by the method of claim 5.

18. A resinous composition prepared by the method of claim 7.

* * * * *